(12) United States Patent
Foote et al.

(10) Patent No.: US 7,883,223 B1
(45) Date of Patent: Feb. 8, 2011

(54) MIRROR SYSTEM WITH RAPID INSTALLATION FASTENING COMPONENTS

(75) Inventors: Keith D. Foote, Kentwood, MI (US); Ian Boddy, Ada, MI (US); Kenneth C. Peterson, Comstock Park, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 0 days.

(21) Appl. No.: 11/745,538

(22) Filed: May 8, 2007

Related U.S. Application Data

(63) Continuation of application No. 10/605,989, filed on Nov. 12, 2003, now abandoned.

(60) Provisional application No. 60/746,706, filed on May 8, 2006, provisional application No. 60/319,688, filed on Nov. 12, 2002.

(51) Int. Cl.
*G02B 7/182* (2006.01)
*B60R 1/06* (2006.01)

(52) U.S. Cl. ........................ 359/841; 359/877

(58) Field of Classification Search ........... 359/841, 359/872, 875, 876, 877
See application file for complete search history.

(56) References Cited

U.S. PATENT DOCUMENTS

| | | | | |
|---|---|---|---|---|
| 4,116,538 | A * | 9/1978 | Oskam | 359/874 |
| 4,488,778 | A | 12/1984 | Polzer et al. | |
| 4,593,878 | A | 6/1986 | Stewart | |
| 4,606,619 | A * | 8/1986 | Yamana | 248/549 |
| 4,643,544 | A | 2/1987 | Loughran | |
| 4,645,164 | A | 2/1987 | Manzoni | |
| 4,696,555 | A * | 9/1987 | Enomoto | 359/874 |
| 4,701,037 | A * | 10/1987 | Bramer | 359/874 |
| 4,786,156 | A * | 11/1988 | Kotani et al. | 359/872 |
| 4,809,561 | A * | 3/1989 | Tsuyama | 74/502.1 |
| 4,867,408 | A | 9/1989 | Ozaki | |
| 4,877,214 | A | 10/1989 | Toshiaki et al. | |
| 4,915,493 | A * | 4/1990 | Fisher et al. | 359/874 |
| 4,981,279 | A | 1/1991 | Andreas et al. | |
| 4,998,814 | A * | 3/1991 | Perry | 359/871 |
| 5,223,985 | A * | 6/1993 | Guttenberger et al. | 359/872 |
| 5,245,480 | A * | 9/1993 | Polzer | 359/841 |
| 5,355,255 | A | 10/1994 | Assinder | |
| 5,473,476 | A * | 12/1995 | Fujita | 359/872 |
| 5,604,645 | A | 2/1997 | Weaver | |
| 5,615,054 | A | 3/1997 | Lang et al. | |
| 5,667,896 | A | 9/1997 | Carter et al. | |
| 5,721,646 | A * | 2/1998 | Catlin et al. | 359/865 |
| 5,781,353 | A * | 7/1998 | Seubert et al. | 359/841 |
| 5,786,948 | A | 7/1998 | Gold | |
| 6,168,279 | B1 * | 1/2001 | Schnell | 359/872 |
| 6,347,872 | B1 | 2/2002 | Brechbill et al. | |
| 6,352,348 | B1 | 3/2002 | Lang et al. | |
| 6,467,918 | B2 | 10/2002 | Strode et al. | |

(Continued)

*Primary Examiner*—Ricky D Shafer
(74) *Attorney, Agent, or Firm*—McGarry Bair PC

(57) ABSTRACT

A mirror system for a motor vehicle comprises a reflective element assembly, a support bracket, a tilt actuator, and a fastener system for fastening at least one of the reflective element assembly and the tilt actuator to at least one of the tilt actuator and the support bracket. The fastener system comprises a projection on one of the reflective element assembly and the support bracket, and a receptacle on the other of the support bracket and the tilt actuator. The projection can be removably interlocked with the receptacle to fasten the reflective element assembly or the tilt actuator to the tilt actuator or the support bracket, respectively.

6 Claims, 16 Drawing Sheets

U.S. PATENT DOCUMENTS

| | | | |
|---|---|---|---|
| 6,550,924 B2 * | 4/2003 | Romas | 359/841 |
| 6,830,352 B2 * | 12/2004 | Lang et al. | 359/872 |
| 7,033,033 B2 * | 4/2006 | Ishigami | 359/872 |
| 7,044,612 B2 * | 5/2006 | Centmayer et al. | 359/876 |
| 7,048,393 B2 * | 5/2006 | Sugiyama | 359/871 |
| 7,322,710 B2 * | 1/2008 | Foote et al. | 359/876 |
| 2002/0027727 A1 | 3/2002 | Lang et al. | |

* cited by examiner

MIRROR SYSTEM WITH RAPID INSTALLATION FASTENING COMPONENTS

CROSS-REFERENCE TO RELATED APPLICATION

This application is a continuation-in-part of U.S. application Ser. No. 10/605,989, filed Nov. 12, 2003, which claims the benefit of U.S. provisional application Ser. No. 60/319,688, filed Nov. 12, 2002, and also claims the benefit of U.S. provisional application Ser. No. 60/746,706, filed May 8, 2006, which are incorporated herein in their entirety.

BACKGROUND OF THE INVENTION

1. Field of the Invention

The invention relates to a motor vehicle mirror and, more particularly to a motor vehicle mirror having components of a reflective element assembly mounted to a supporting structure through an interlocking assembly.

2. Description of the Related Art

Rear view mirrors, specifically external mirrors, are ubiquitous for contemporary motor vehicles and have long been used to aid the driver in operating the vehicle, especially in improving the rearward view of the driver. Rear view mirrors have increasingly incorporated additional functionality beyond the accurate rendering of a reflected image. This increased functionality has increased the number of components required to be assembled into the mirror. One example of such a component is a tilt actuator to adjust the mirror's field of view fixedly mounted to a rigid frame within the mirror assembly housing, and operably connected to a reflective element assembly.

The reflective element assembly typically comprises multiple pieces (and multiple layers) comprising a mounting panel or "glass case" to which a reflective element, i.e. the mirror, is attached. The reflective element is fixedly attached to the glass case with an adhesive or a mechanical hold-down assembly. The reflective element typically comprises a piece of glass with a reflective coating on one side, similar to a conventional household mirror. A glass or rigid, impact-resistant clear plastic plate may be attached to the mirror housing to enclose the reflective element and protect it from impact or the weather. A bezel may also be placed over the reflective element to secure the reflective element to the mounting panel, add further protection to the reflective element and/or people adjacent to the vehicle, and improve the appearance of the reflective element.

The various components making up the reflective element can be relatively heavy, particularly where several pieces of glass are used. In particular, mirrors used for trucks, SUVs, and other large vehicles can be quite large and heavy. Heavier mirrors require stronger supporting and mounting components and more robust tilt actuators, and can contribute to a reduction in the mileage of the vehicle due to the weight of the mirror.

In order to reduce costs, mirror components have been modularized, and assembly processes have been improved. However, components, such as a tilt actuator, are currently mounted to the support bracket through threaded fasteners, such as screws, or snap-fit or rivet-type fasteners; the tilt actuator is also operably connected to a reflective element assembly, which can also comprise such fasteners. Fasteners also frequently require complementary fastening structures that add weight and fabrication complexity to the mirror assembly.

These fasteners take time to install, and threaded fasteners may be over tightened, thereby stripping the threads of the fastener seat, and weakening the connection. The actuator and attached reflective element are the heaviest components of the mirror, requiring a secure connection between the actuator and the support bracket. The requirement of a strong fastener system and the difficulty in properly attaching the actuator to the support bracket add cost to the mirror system.

Additionally, the attachment of the tilt actuator to the support bracket and the reflective element assembly to the tilt actuator is typically done by aligning the component to a supporting structure from a side or horizontal direction relative to the in-use orientation of the mirror. Thus, for example, the support bracket may be turned 90° to facilitate the assembly of the actuator to the frame. However, there are savings in time and improvements in automated assembly that can be realized with keeping the mirror in a stationary orientation during the assembly process, and attaching the mirror components from a common direction, such as from above the mirror system.

SUMMARY OF THE INVENTION

A mirror system for a motor vehicle comprises a reflective element assembly providing a reflective view to an operator of the motor vehicle, a support bracket for supporting the reflective element assembly, a tilt actuator for adjusting the reflective view from the reflective element assembly, and a fastener system for fastening at least one of the reflective element assembly and the tilt actuator to at least one of the tilt actuator and the support bracket. The fastener system comprises at least one projection on one of the reflective element assembly and the support bracket, and at least one receptacle on the other of the support bracket and the tilt actuator, and the at least one projection can be removably interlocked with the at least one receptacle to fasten the at least one of the reflective element assembly or the tilt actuator to the at least one of the tilt actuator or the support bracket.

A motor vehicle mirror system comprises a reflective element assembly providing a reflective view to an operator of the motor vehicle, a support bracket for supporting the reflective element assembly, and a tilt actuator for adjusting the reflective view from the reflective element assembly. A fastener system for the motor vehicle mirror system comprises at least one projection adapted for attachment on one of a reflective element assembly and a support bracket, and at least one receptacle adapted for attachment on the other of a support bracket and a tilt actuator. The at least one projection can be removably interlocked with the at least one receptacle to fasten at least one of a reflective element assembly or a tilt actuator to the at least one of a tilt actuator or a support bracket.

DESCRIPTION OF EMBODIMENTS OF THE INVENTION

Figure 1:
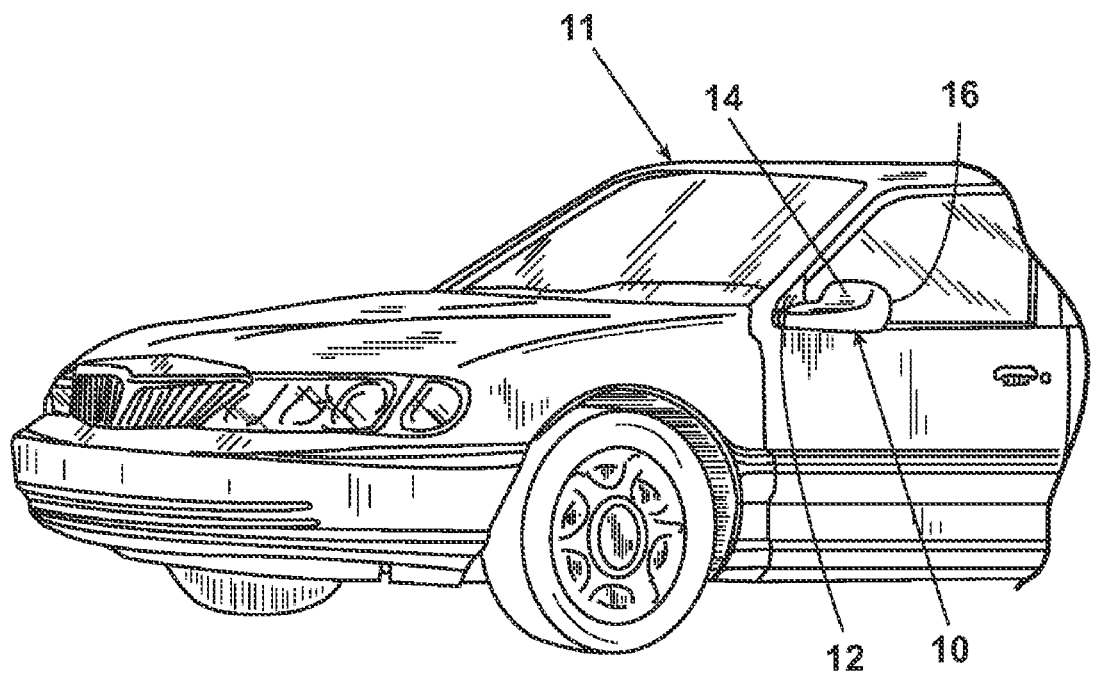
FIG. 1 is a perspective view of a portion of a motor vehicle having an attached mirror system comprising a reflective element assembly and a rapid installation fastening system according to the invention.

As shown in FIG. 1, an exterior motor vehicle mirror system 10 according to the invention is mounted in a conventional fashion through a base 12 to a motor vehicle 11. The mirror system 10 comprises a housing 14 enclosing a reflective element assembly 16. The housing 14 and enclosed reflective element assembly 16 can be pivotally attached to the base 12 for moving the housing 14 and reflective element assembly 16 to a folded position adjacent a side of the vehicle, and unfolding the housing 14 and reflective element assembly 16 to an in-use position for providing an operator of the vehicle 11 with a rearward view. Alternatively, the housing 14 and reflective element assembly 16 can be fixedly attached to the base 12. As well, the housing 14 and reflective element assembly 16 can be adapted to selectively extend laterally outwardly or retract laterally inwardly relative to the base 12 in a well-known manner to provide an enhanced rearward view, such as when towing a trailer.

Figure 2:
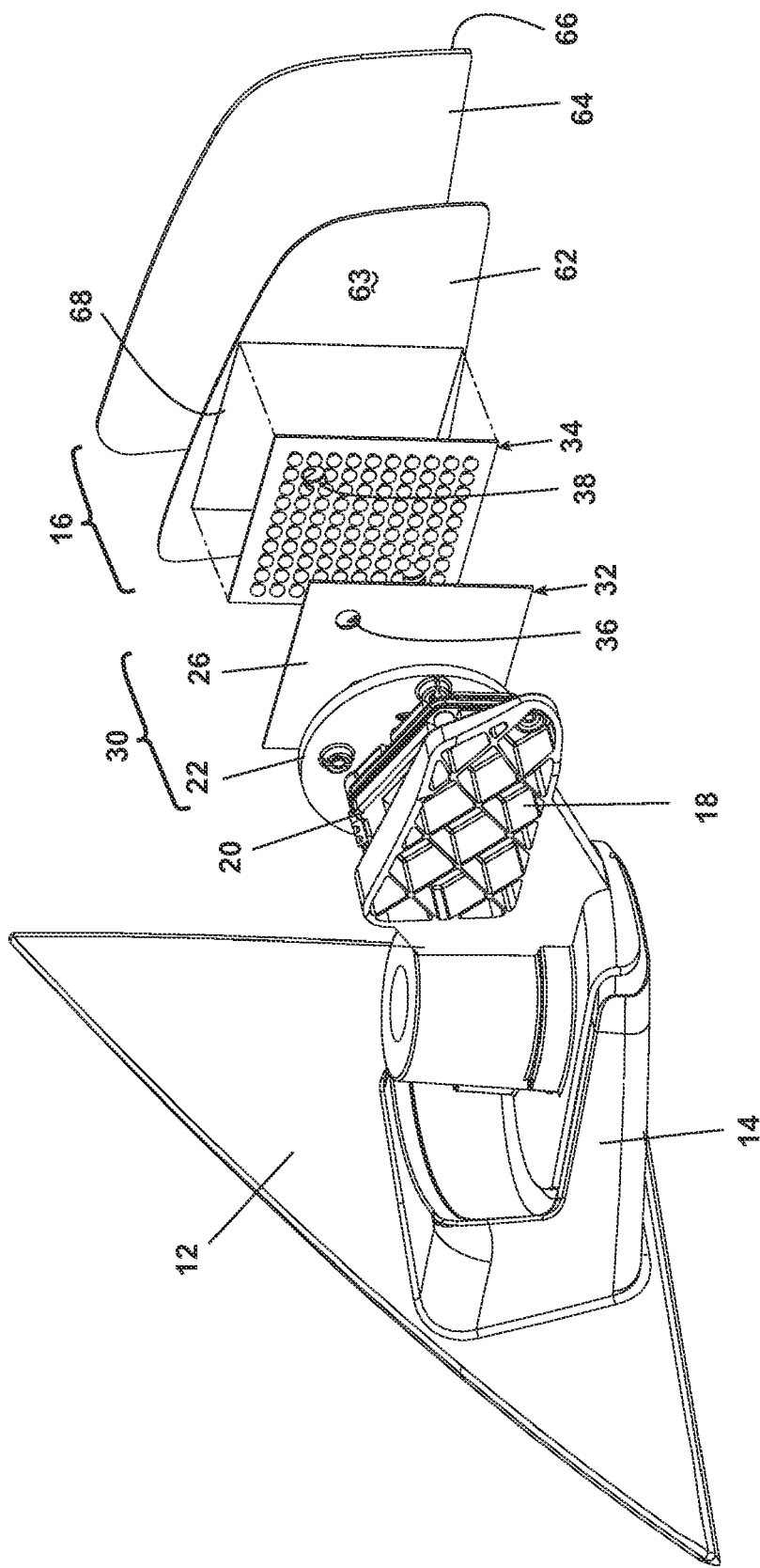
FIG. 2 is an exploded rear view of the interior structure of the mirror system of FIG. 1 illustrating a first embodiment of the rapid installation fastening system for fastening a reflective element assembly to a tilt actuator.
Figure 3:
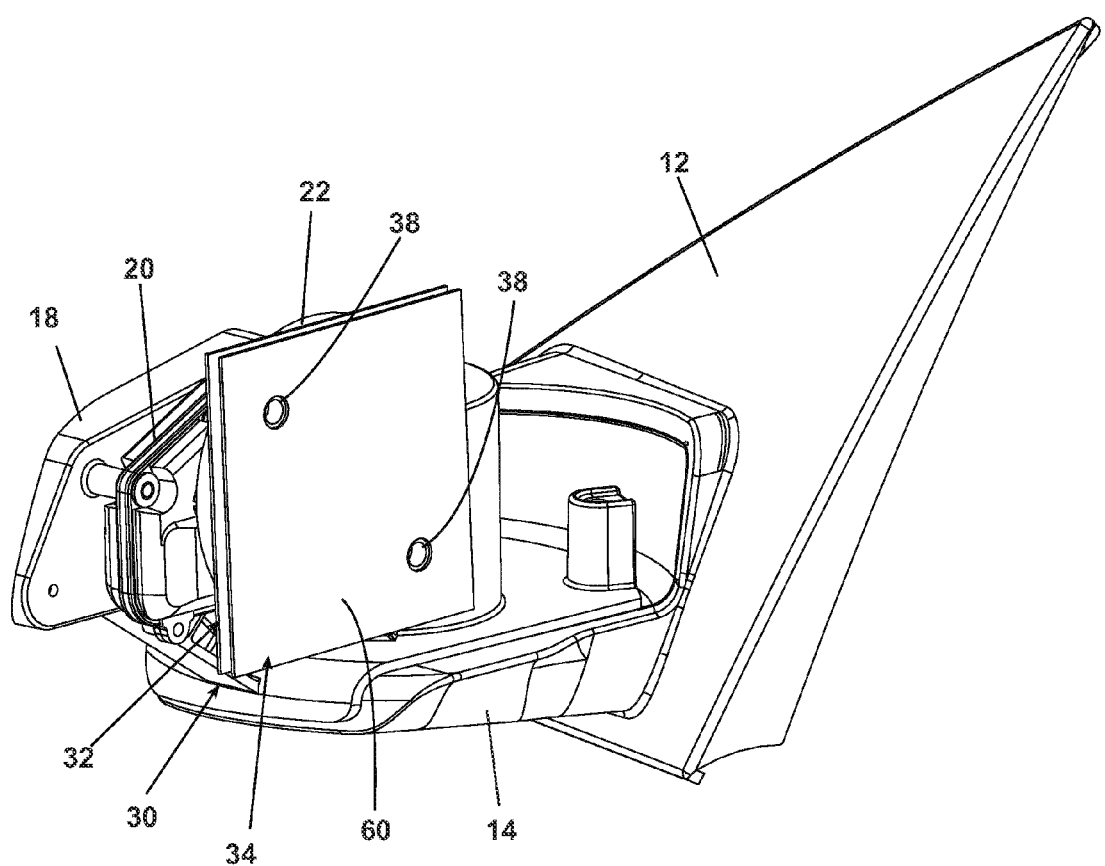
FIG. 3 is a front perspective view of the interior structure of the mirror system of FIG. 2 with the reflective element removed for clarity.
Figure 4:
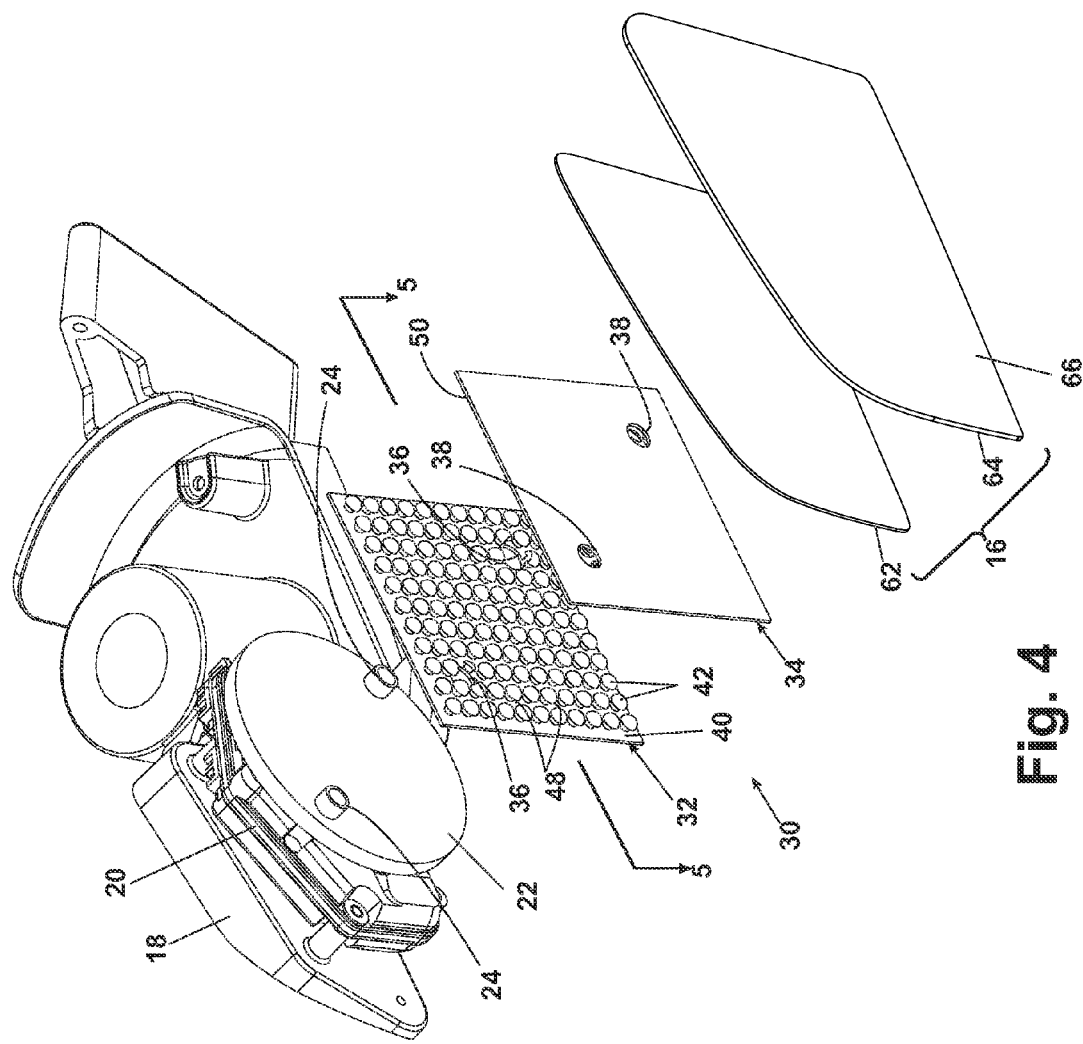
FIG. 4 is an exploded front view of the mirror system of FIG. 2.
Figure 7:
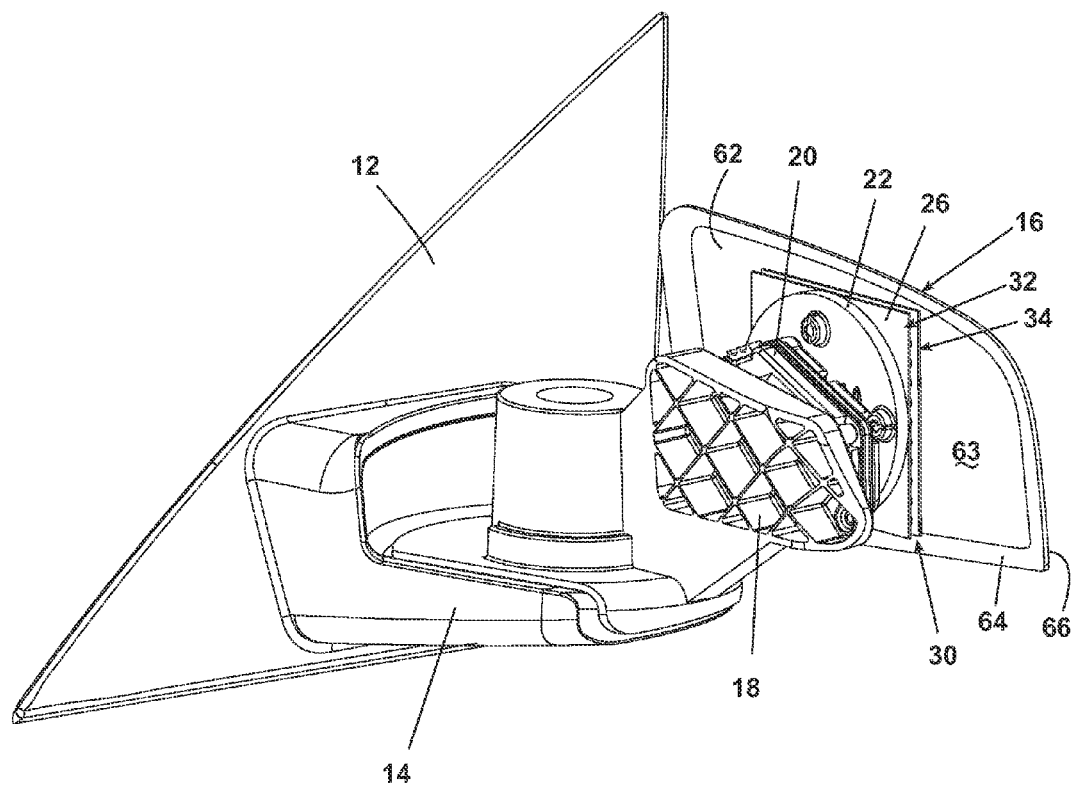
FIG. 7 is a perspective view of the interior structure of the mirror system of FIG. 1 showing the reflective element mounted to the tilt actuator.

Referring also to FIGS. 2, 4, and 7, in a first embodiment of the invention, a support bracket 18 is fixedly mounted within the housing 14 and supports a tilt actuator 20 for vertical and horizontal tilting of the reflective element assembly 16 in order to adjust the rearward field of vision provided thereby. The reflective element assembly 16 is operably connected to the tilt actuator 20 through a fastening system exemplified as a circular mounting plate 22 and an interlocking fastener assembly 30, as further described hereinafter.

The circular mounting plate 22 is a plate-like body adapted for operable register with the tilt actuator 20 so that the mounting plate 22 will tilt about a vertical axis or a horizontal axis with the operation of the tilt actuator 20 in a manner well-known in the art.

Figure 5:
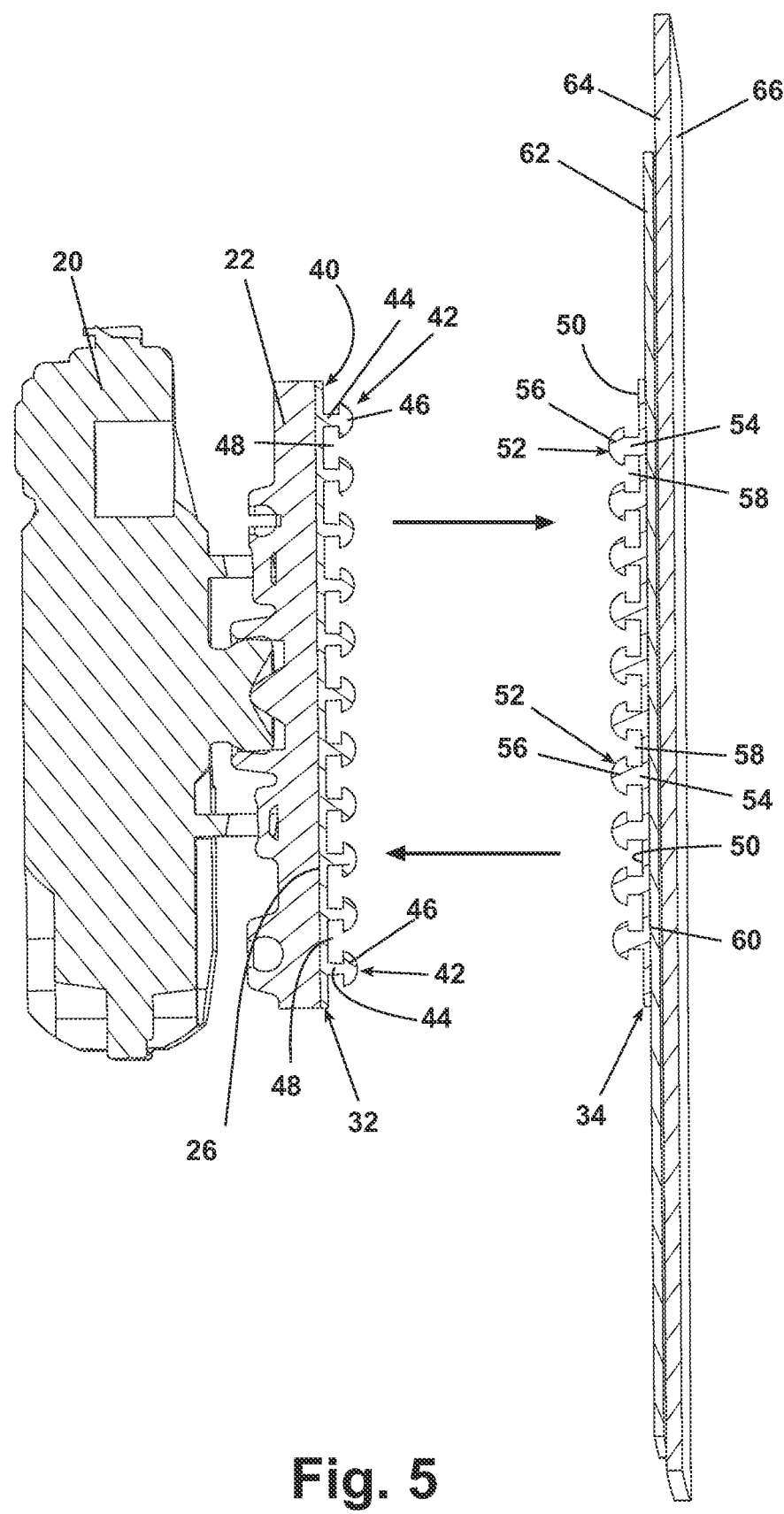
FIG. 5 is a partial sectional view taken along line 5-5 of a portion of the mirror system of FIG. 4 showing mating interlocking panels in position to be interlocked.

As shown also in FIG. 5, the interlocking fastener assembly 30 comprises a base plate 32 and a mirror plate 34. The base plate 32 comprises a panel-like body having a reverse side comprising a planar mounting face 26 in opposed, parallel juxtaposition with an obverse side comprising an attachment stem surface 40. The mirror plate 34 comprises a panel-like body having a reverse side comprising a planar mounting face 60 in opposed, parallel juxtaposition with an obverse side comprising an attachment stem surface 50. The mounting faces 26, 60 are adapted for mating communication as hereinafter described.

As shown in FIG. 4, the mounting plate 22 is provided with a pair of diagonally-opposed, cylindrical mounting posts 24 extending orthogonally from the mounting plate 22 in generally parallel juxtaposition. The base plate 32 is provided with a pair of base plate post apertures 36 in spaced-apart juxtaposition adapted for cooperative register with the cylindrical mounting posts 24. Similarly, the mirror plate 34 is provided with a pair of mirror plate post apertures 38 in spaced-apart juxtaposition adapted for cooperative register with the cylindrical mounting posts 24. The joining of the mounting plate 22, the base plate 32, and mirror plate 34, with the mounting posts 24 inserted through the aligned apertures 36, 38 will result in the proper relative orientation of the mounting plate 22, the base plate 32, and the mirror plate 34 during assembly of the mirror system 10, and will minimize relative movement of the mounting plate 22, the base plate 32, and the mirror plate 34, thereby increasing the rigidity of the interlocking fastener assembly 30. Other positioning and strengthening elements can be used, such as mating ribs and channels, to ensure the proper orientation and relative rigidity of the assembled plates 22, 32, 34.

In a preferred embodiment, the interlocking fastener assembly 30 comprises an array of interlocking fasteners, such as the Dual Lock™ fastener system manufactured by 3M Company, Inc. Alternatively, the interlocking fastener assembly 30 can comprise other, readily-detachable fastener devices such as a hook and loop fastener system, also known as Velcro, or an array of interference fittings providing a snap-fit assembly. The advantage of such devices is the ability to assemble and disassemble components without the necessity of fastening tools or specialized disassembly tools.

Referring again to FIG. 5, the base plate attachment stem surface 40 comprises a plurality of interlocking fastening elements, referred to herein as attachment stems 42, extending orthogonally therefrom in an ordered, regularly-spaced array. Each attachment stem 42 comprises a generally cylindrical shaft 44 terminating in an expanded, mushroom-shaped head 46. Each assemblage of four adjoining attachment stems 42 defines an interstitial space 48. Similarly, the mirror plate attachment stem surface 50 comprises a plurality of interlocking fastening elements, referred to herein as attachment stems 52, extending orthogonally therefrom in an ordered, regularly-spaced array. Each attachment stem 52 comprises a generally cylindrical shaft 54 terminating in expanded, mushroom-shaped head 56. Each assemblage of four adjoining attachment stems 52 defines an interstitial space 58. The base plate attachment stem surface 40 is adapted for interlocking attachment to the mirror plate attachment stem surface 50, as hereinafter described.

Figure 6:
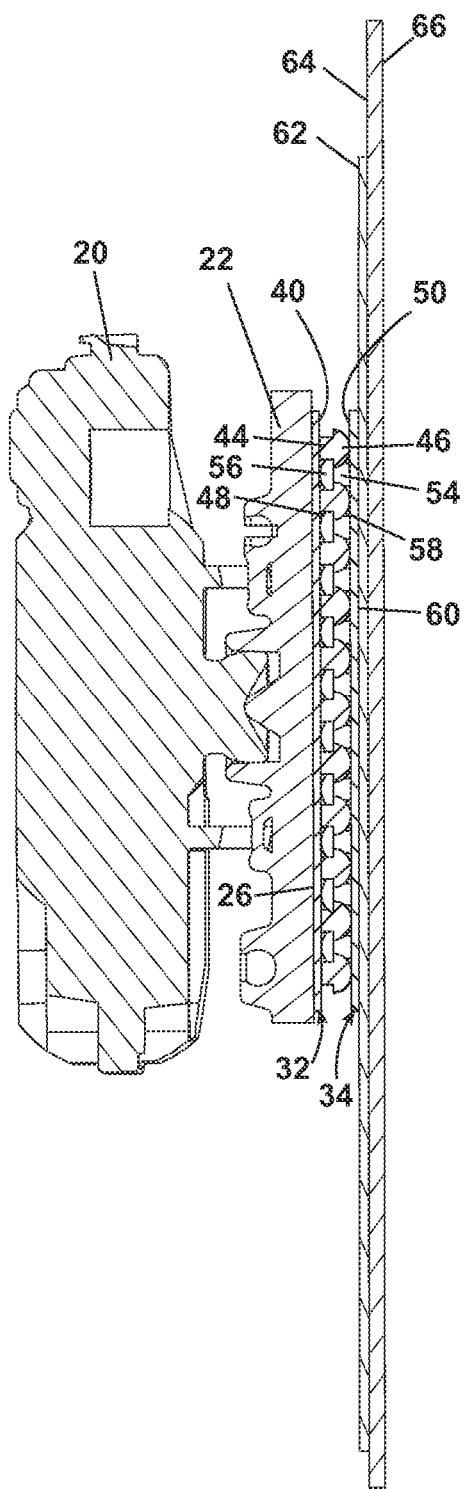
FIG. 6 is a side view of the interlocking panels of FIG. 5 in an interlocked configuration.

The base plate 32 is fixedly attached to the circular mounting plate 22 through a suitable means of attachment, such as an adhesive or ultrasonic welding, so that the mounting posts 24 extend through the base plate post apertures 36, thereby ensuring the proper positioning and attachment of the base plate 32 to the circular mounting plate 22. Alternatively, the interlock mounting details 42-46 can be integrally formed onto the mounting plate 22 eliminating the need for a separately-attached base plate 32. The mirror plate 34 is brought into cooperative register with the base plate 32, with the mounting posts 24 extending through the mirror plate post apertures 38, so that the heads 46 of the attachment stems 42 slide past the heads 56 of the attachment stems 52 to be received in the interstitial spaces 58, and the heads 56 of the attachment stems 52 are received in the interstitial spaces 48, thereby interlocking the base plate 32 and the mirror plate 34 to each other in proper orientation as shown in FIG. 6. The base plate 32 can be readily separated from the mirror plate 34 by exerting a normal pulling force on the plates 32, 34 sufficient to slide the heads 46, 56 out of the interstitial spaces 48, 58 past each other.

Referring again to FIG. 2, the reflective element assembly 16 comprises a planar reflective element mounting panel 62 having a reverse face 63, and a planar glass lens 66 having a reflective surface 64 in a generally conventional configuration well-known in the art. The reverse face 63 can optionally be provided with a mirror plate alignment outline 68 corresponding to the perimeter of the mirror plate 34 for proper alignment of the mirror plate 34 with the reflective element mounting panel 62. The mirror plate alignment outline 68 comprises a rectilinear configuration of lines formed on or in the reverse face 63 through a suitable process such as etching, molding, or embossing.

As shown in FIGS. 2 and 7, the reflective element mounting panel 62 can be attached to the mirror plate 34 by a suitable means of attachment, such as an adhesive or ultrasonic welding, of the mounting surface 60 to the reverse face 63. Alternatively, the interlock mounting details 42-46 can be integrally formed onto the mounting panel 62 eliminating the need for a separately-attached mirror plate 34. The glass lens 66 with the reflective surface 64 can then be attached to the reflective element mounting panel 62 in a generally conventional manner to provide the tiltable reflective element assembly 16.

Figure 8:
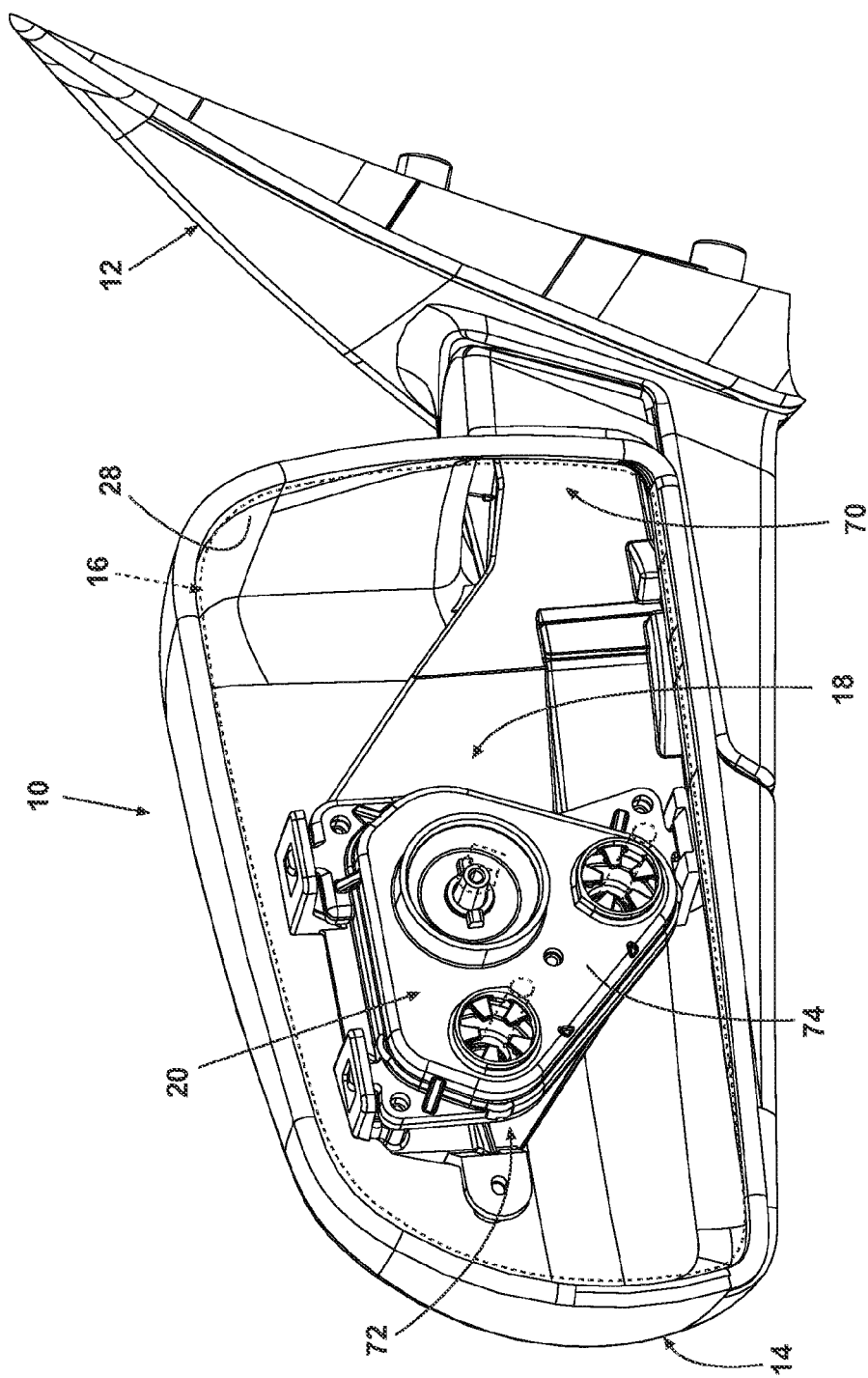
FIG. 8 is a perspective view of the mirror system illustrated in FIG. 1 with portions removed for clarity illustrating a second embodiment of the rapid installation fastening system for fastening a tilt actuator to a support bracket.

Referring now to FIG. 8, a second embodiment of the invention is illustrated. The housing 14 has an opening 28 through which the reflective element assembly 16 (shown in phantom) can be observed. In FIG. 8, the support bracket 18 is illustrated extending from the base 12 into the interior of the housing 14. The support bracket 18 has a pivot end 70 adapted for pivotal attachment to the base 12, and a cantilever end 72 adapted for mounting the tilt actuator 20 thereto, as hereinafter described. The tilt actuator 20 is illustrated as comprising a tilt actuator housing 74.

Figure 9:
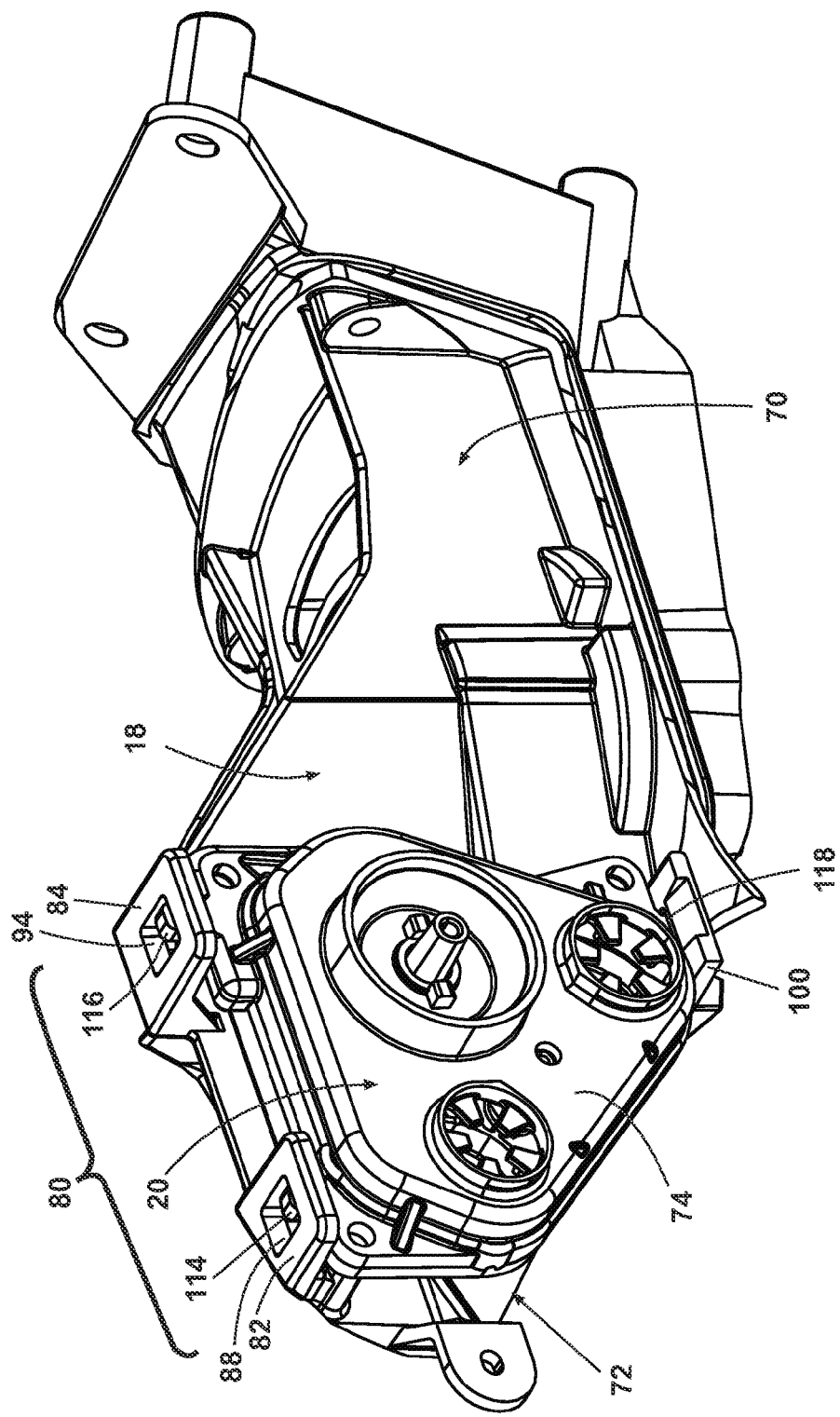
FIG. 9 is a perspective view of the support bracket and tilt actuator illustrated in FIG. 8.
Figure 10:
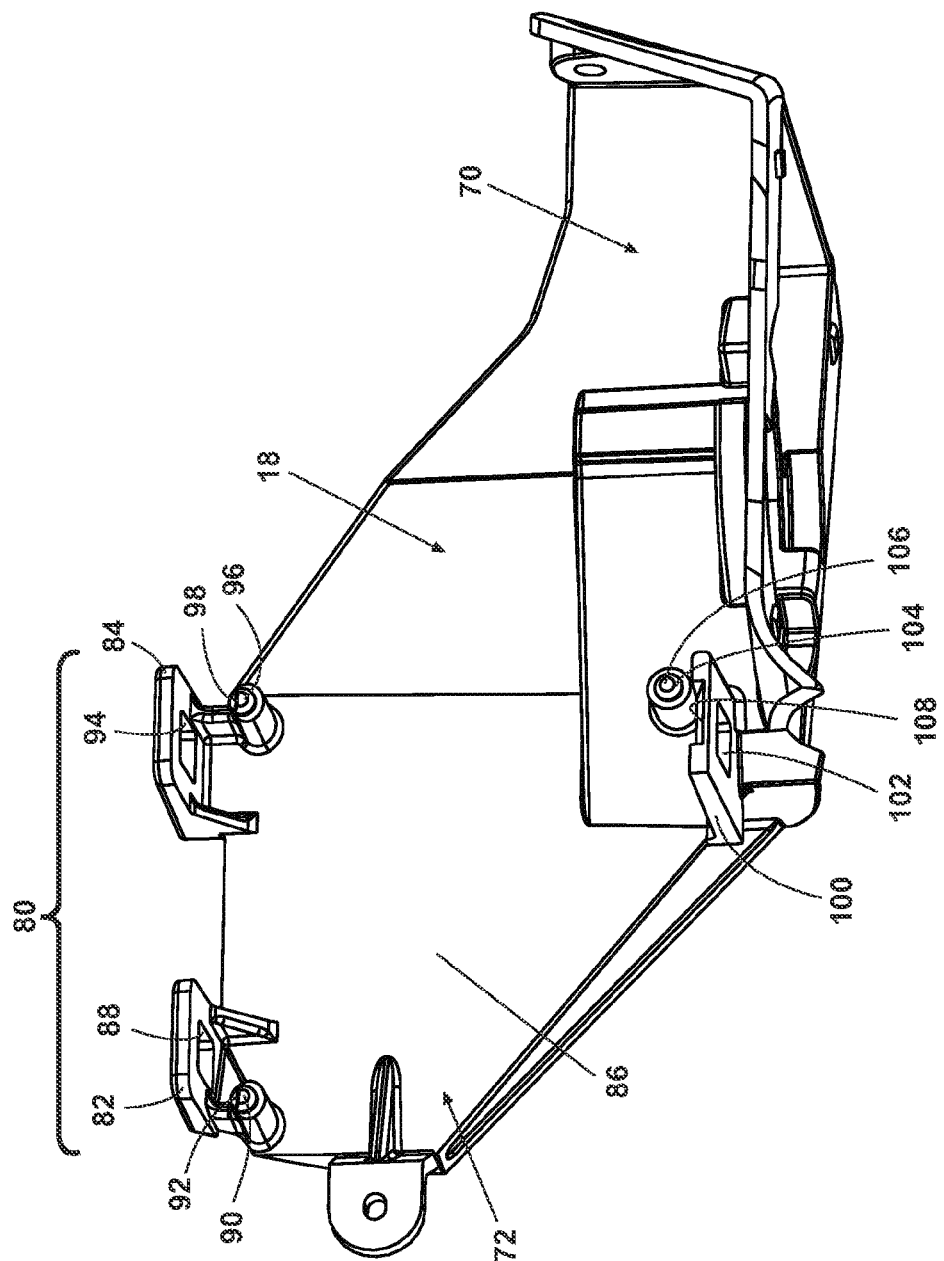
FIG. 10 is a perspective view of the support bracket illustrated in FIG. 8 showing a tilt actuator cradle according to the invention.

Referring now to FIG. 9, the tilt actuator 20 is mounted to the support bracket 18 through a fastening system exemplified as an actuator cradle 80 comprising a pair of catches 82, 84 and a locking catch 100. Referring also to FIG. 10, the catch 82 is a generally plate-like body extending orthogonally from an upper edge of a wall 86 comprising a portion of the cantilever end 72. The catch 82 has an opening 88 extending therethrough, which is illustrated as generally rectilinear although it can assume other selected configurations. Extending orthogonally away from the wall 86 and laterally toward the cantilever end 72 below the catch 82 is an alignment post 90 terminating in a pin 92 extending coaxially therefrom. The catch 84 has an opening 94 extending therethrough, which is illustrated as generally rectilinear although it can assume other selected configurations. Extending orthogonally away from the wall 86 and laterally toward the pivot end 70 below the catch 84 is an alignment post 96 terminating in a pin 98 extending coaxially therefrom.

The locking catch 100 is a generally plate-like body extending orthogonally from the lower edge of the wall 86. The locking catch 100 has an opening 102 extending therethrough, which is illustrated as generally rectilinear although it can assume other selected configurations. Extending orthogonally away from the wall 86 and laterally toward the pivot end 70 above the locking catch 100 is an alignment post 104 terminating in a pin 106 extending coaxially therefrom. An upper surface of the locking catch 100 has a beveled edge 108 facing away from the wall 86.

Figure 9A:
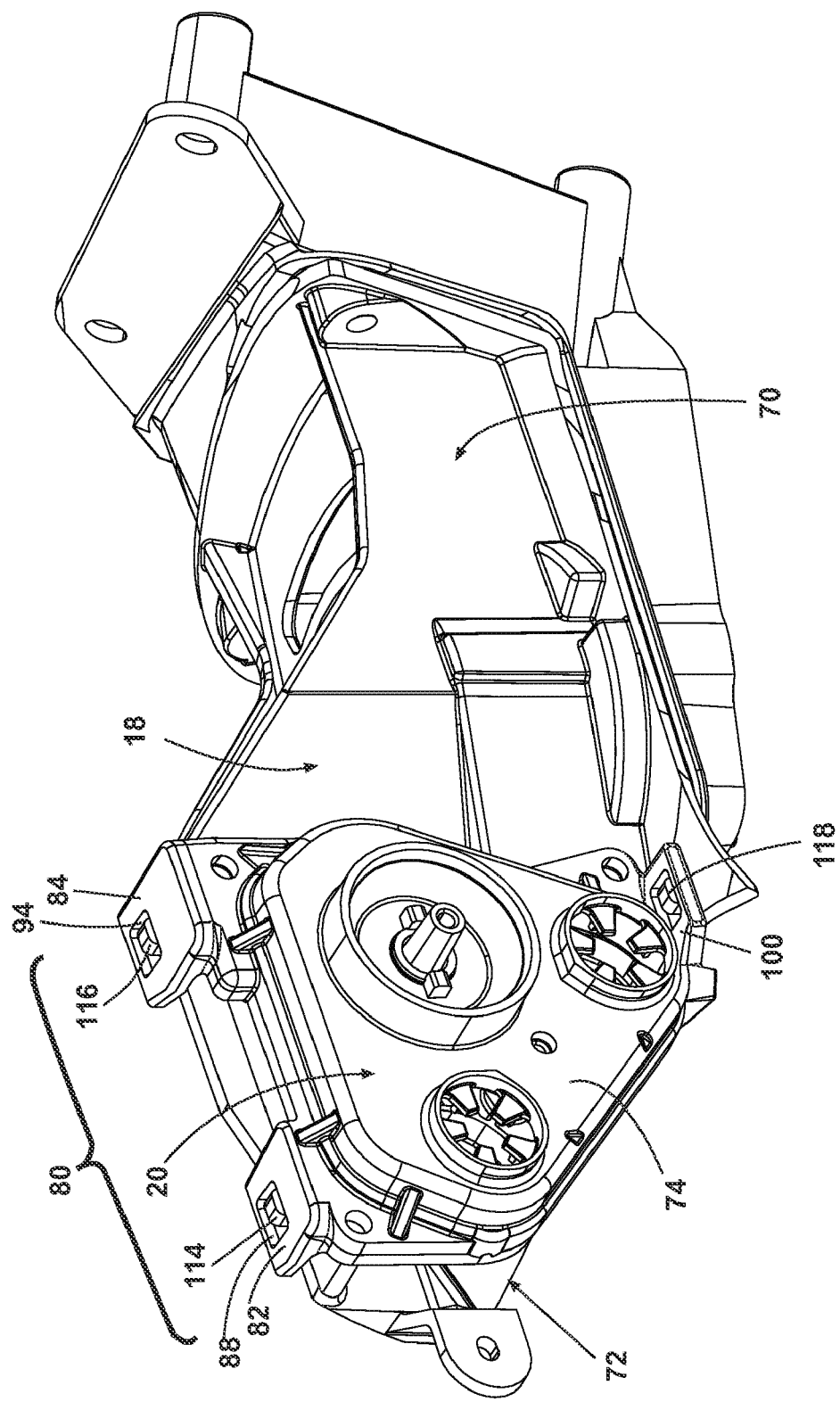
FIG. 9A is a perspective view of an alternate embodiment of the rapid installation fastening system for the support bracket and tilt actuator illustrated in FIG. 8.

Referring to FIG. 9A, an alternate embodiment of the fastening system is illustrated wherein the catches and mounting ears are interchanged so that the catches 82, 84, 100 are mounted on the tilt actuator 20, and the mounting ears 114, 116, 118 are mounted on the support bracket 18. The function and operation of the interchanged catches and mounting ears is the same as described above.

Figure 11:
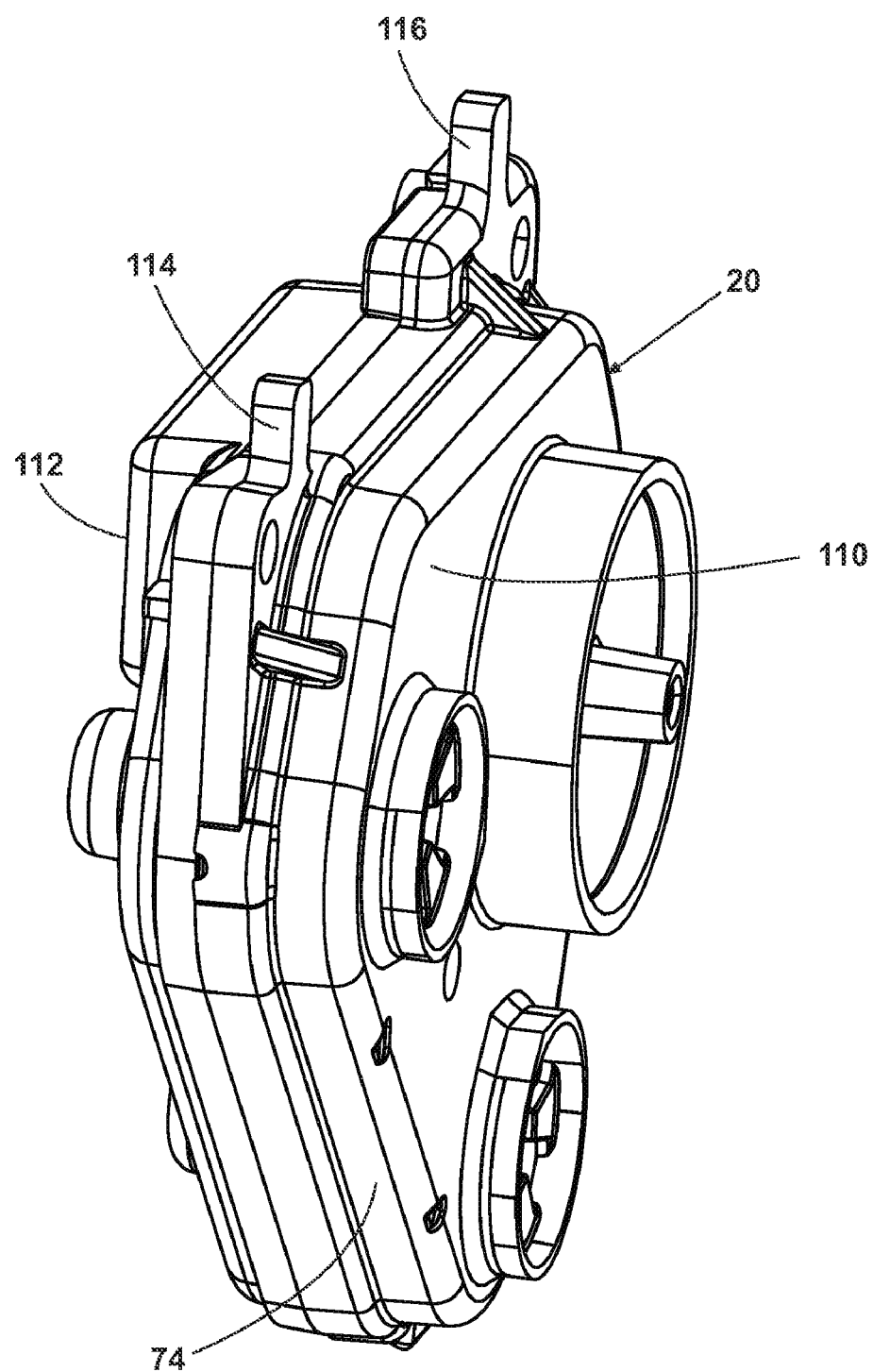
FIG. 11 is a first perspective view of the tilt actuator illustrated in FIG. 8 illustrating a plurality of mounting ears for attaching the tilt actuator to the tilt actuator cradle.
Figure 12:
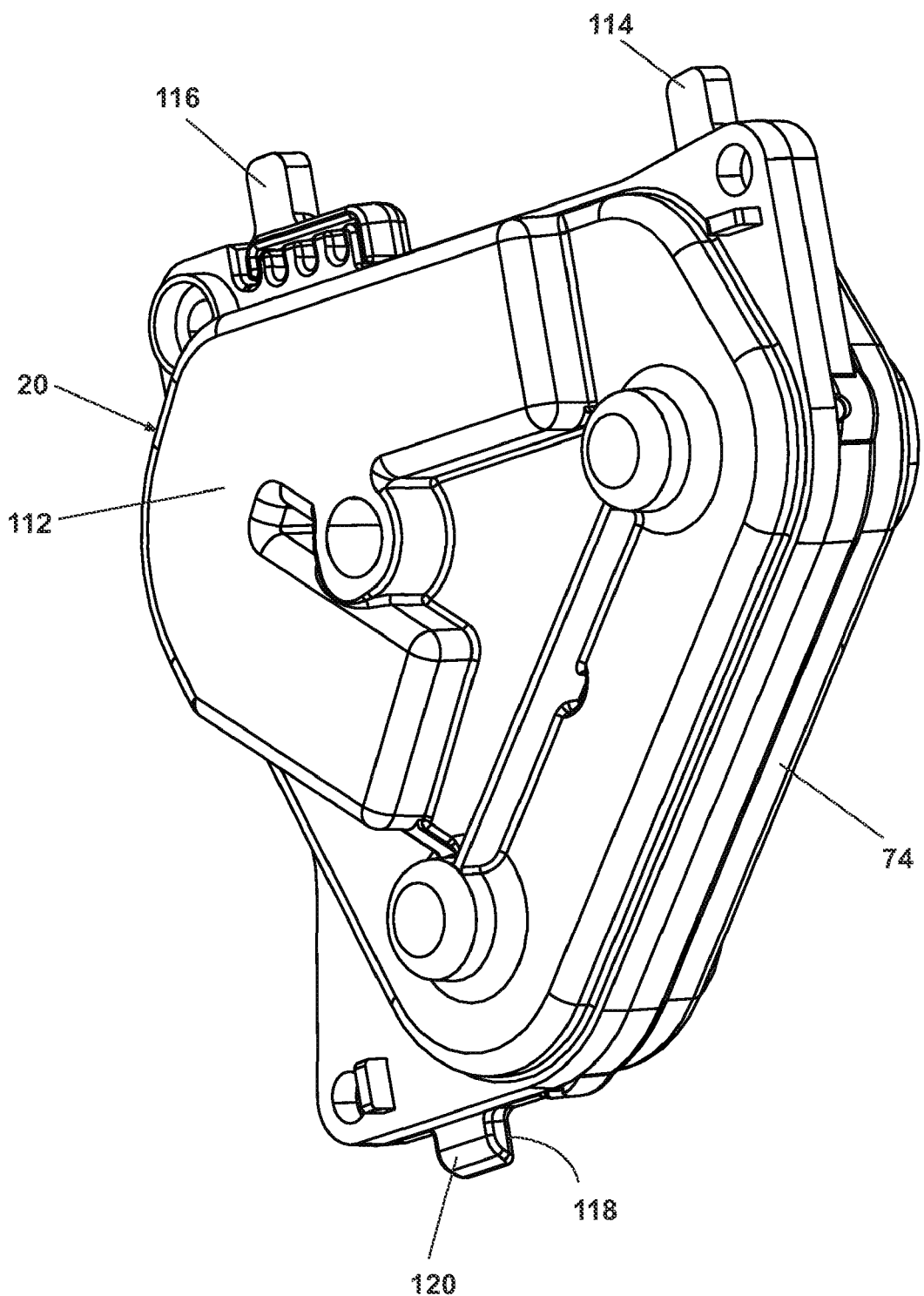
FIG. 12 is a second perspective view of the tilt actuator illustrated in FIG. 11.

Referring now to FIGS. 11 and 12, the tilt actuator housing 74 comprises an obverse face 110 and a reverse face 112. The obverse face 110 faces the reflective element assembly 16; the reverse face 112 faces the wall 86. Extending upwardly away from an upper wall of the housing 74 is a pair of mounting ears 114, 116 adapted for insertion into the openings 88, 94 of the catches 82, 84, respectively. Extending downwardly away from a lower wall of the housing 74 is a mounting ear 118 adapted for insertion into the opening 102 of the locking catch 100. The mounting ear 118 has a beveled face 120 adapted to engage the beveled edge 108 of the locking catch 100.

Referring again to FIG. 9, the tilt actuator 20 is installed to the support bracket 18 by inserting the mounting ears 114, 116 into the openings 88, 94 of the catches 82, 84, respectively. The tilt actuator 20 is then rotated downwardly so that the mounting ear 118 is brought into registry with the locking catch 100. The beveled face 120 travels along the beveled edge 108 as the tilt actuator 20 is rotated, deflecting the locking catch 100 downwardly until the mounting ear 118 is fully received in the opening 102. The tilt actuator 20 will be securely retained in the cradle 80 by the locking of the mounting ears 114, 116, 118 to the catches 82, 84, 100. Preferably, the reverse face 112 of the housing 74 will be in contact with the wall 86 to enhance the security of the mounting and minimize vibration of the tilt actuator 20 in the cradle 80.

The tilt actuator 20 can be readily removed from the cradle 80 by deflecting the locking catch 100 away from the tilt actuator 20 until the mounting ear 118 can be removed from the opening 102. The tilt actuator 20 can then be rotated away from the wall 86 to separate the ears 114, 116 from the catches 82, 84.

Figure 13:
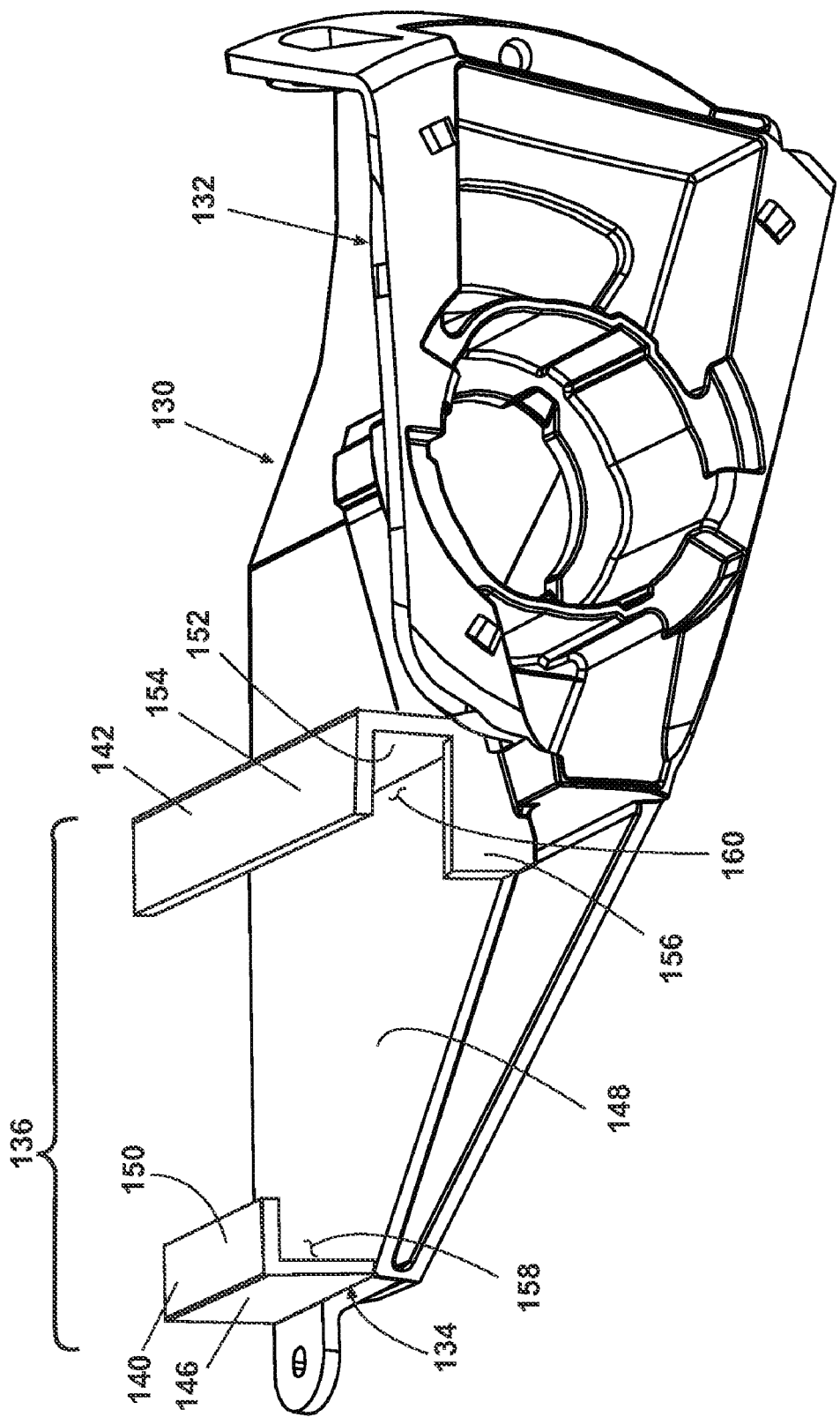
FIG. 13 is a perspective view of a third embodiment of the support bracket and tilt actuator cradle according to the invention.

Referring now to FIG. 13, a fourth embodiment of the invention is illustrated comprising a support bracket 130 having a pivot end 132 and a cantilever end 134. The cantilever end 134 comprises a fastening system exemplified as an actuator cradle 136. The actuator cradle 136 comprises a pair of rails 140, 142 extending along a wall 148 of the support bracket 130 in parallel, spaced-apart juxtaposition. The rail 140 comprises a side wall 146 extending orthogonally away from the wall 148 and terminating in a flange 150 extending inwardly generally parallel to the wall 148. The rail 102 comprises a side wall 152 extending orthogonally away from the wall 148 and terminating in a flange 154 extending inwardly generally parallel to the wall 148. The rail 102 terminates at a lower and in a stop 156 extending generally orthogonally away from the wall 148. As so configured, each rail 140, 142 defines a channelway 158, 160, respectively, extending longitudinally therealong.

A tilt actuator (not shown) having generally the same configuration as the tilt actuator 20 is adapted with lateral projections, such as ribs, for slidable insertion into the channelway is 158, 160 in order to attach the tilt actuator to the actuator cradle 136. The mounting ears 114, 116, 118 illustrated in the first embodiment will be omitted as unnecessary. The stop 104 will retain the tilt actuator in the actuator cradle 136. Additionally, detents or other elements providing an interference or friction fit (not shown) can be included to further secure the tilt actuator in the actuator cradle 136, yet enable its removal as necessary.

Figure 14:
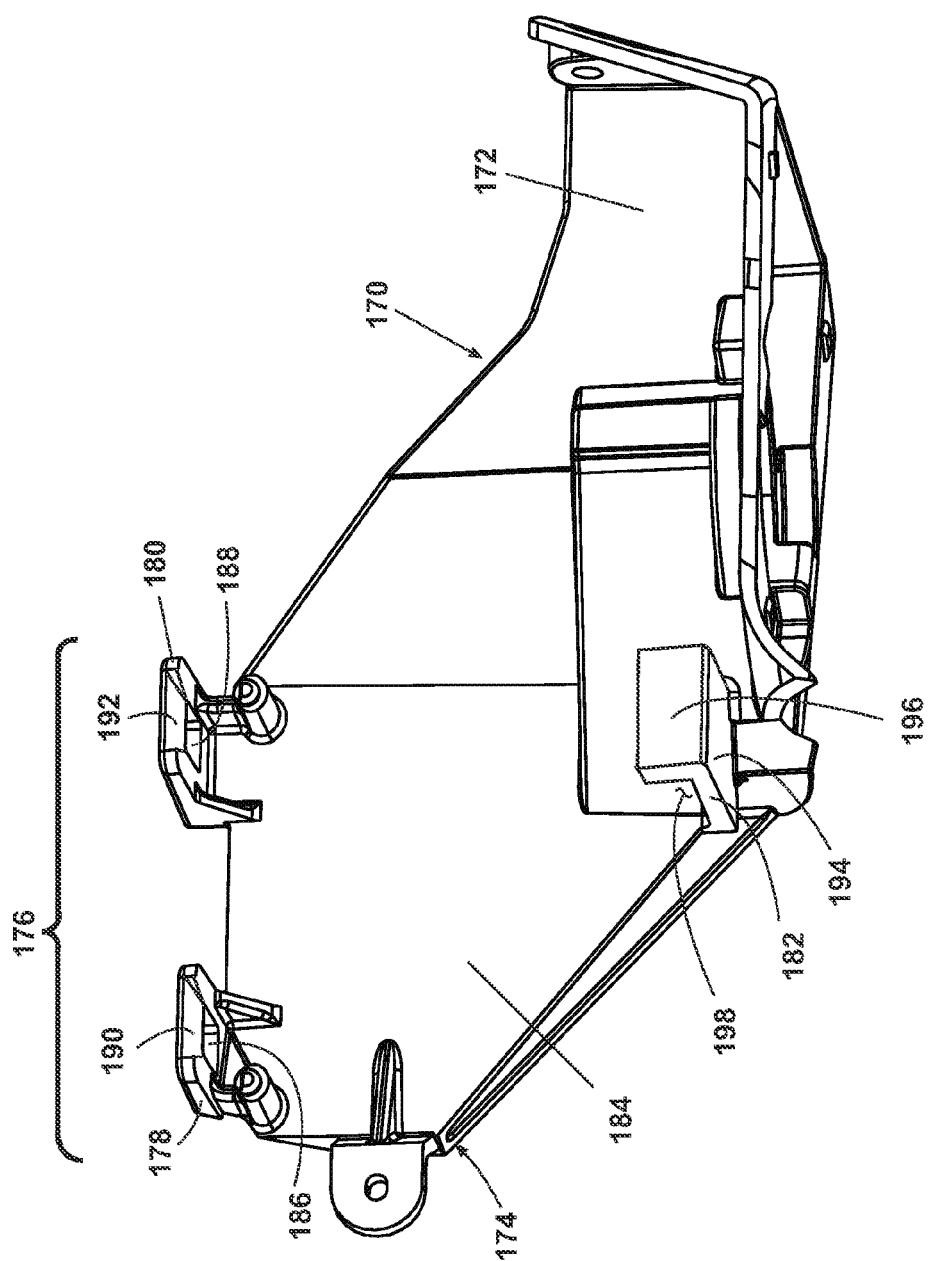
FIG. 14 is a perspective view of a fourth embodiment of the support bracket and tilt actuator cradle according to the invention.

Referring now to FIG. 14 a fifth embodiment of the invention is illustrated comprising a support bracket 170 having a pivot end 172 and a cantilever end 174. The pivot end 172 comprises a fastening system exemplified as an actuator cradle 176 comprising a pair of catches 178, 180 and a mounting bracket 182 extending generally orthogonally away from a wall 184 of the support bracket 170. The catches 178, 180 are similar to the locking catch 100 illustrated in FIG. 10, with openings 186, 188, respectively, and beveled edges 190, 192, respectively for receipt of the mounting ears 114, 116 on the tilt actuator 20.

The support bracket 170 comprises a bottom wall 194 terminating in a flange 196 to form a channelway 198 for receipt of a lower portion of the tilt actuator 20 therein. The tilt actuator 20 is attached to the support bracket 170 by first inserting the lower portion of the tilt actuator 20 into the channelway 198, and rotating the tilt actuator 20 toward the wall 184 so that the mounting ears 114, 116 are snapped into the openings 186, 188. The beveled edges 190, 192 facilitate the insertion of the mounting ears 114, 116 into the openings 186, 188. The actuator cradle 176 enables the tilt actuator 20 to be installed into the actuator cradle 176 in a generally vertical orientation from an upper location relative to the support bracket 170.

The tilt actuator 20 can be readily removed from the actuator cradle 176 by deflecting the catches 178, 180 upwardly away from the tilt actuator 20 until the mounting ears 114, 116 can be removed from the openings 186, 188. The tilt actuator 20 can then be rotated away from the wall 184 to enable the removal of the tilt actuator 20 from the support bracket 170.

Figure 15:
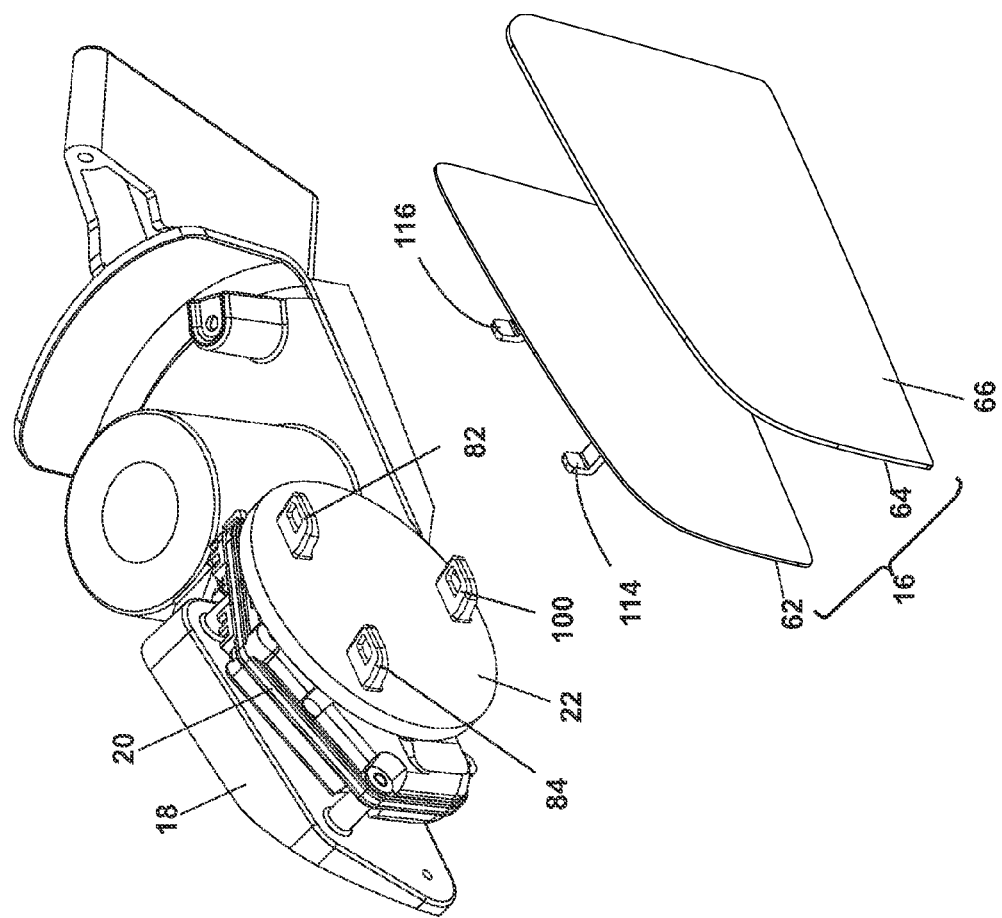
FIG. 15 is an exploded view of an alternate embodiment of the rapid installation fastening system for the tilt actuator and reflective element assembly illustrated in FIG. 4.

Referring to FIG. 15, an alternate embodiment of the fastening system for fastening the reflective element assembly 16 to the tilt actuator 20 is illustrated wherein the catches and mounting ears are interchanged so that the catches 82, 84, 100 are mounted on the mounting plate 22 which is pivotably coupled with the tilt actuator 20 as described above, and the mounting ears 114, 116, 118 are mounted on the reflective element mounting panel 62 (catch 118 not shown at lower portion of mounting panel 62 due to orientation of view). The reflective element assembly 16 can thus be coupled with the tilt actuator 20 through the engagement of the catches 82, 84, 100 with the mounting ears 114, 116, 118, as generally described above.

The invention provides a secure mounting for a reflective element assembly to a tilt actuator, and a tilt actuator to a support bracket, while enabling the reflective element assembly and the tilt actuator to be quickly and efficiently attached to the supporting structure. An assembler can precisely attach the component to the supporting structure without the necessity of additional connectors, such as screws, which are typically used in prior art assemblies. The invention also enables the component to be readily removed from the supporting structure for repair and/or replacement when necessary. Finally, the invention also enables the components to be assembled to the supporting structure from an upper, vertical location without rotating or manipulating the supporting structure, thereby simplifying and facilitating the assembly process.

The mirror system with the rapid installation fastening components is lightweight due to the use of the integrated interlocking elements rather than conventional metal fasteners. The interlocking elements provide a secure attachment of the components to the supporting structures which can be readily assembled and disassembled without the use of specialized tools. The use of the interlocking elements and the elimination of conventional fasteners and their complementary structural components results in a lighter, more streamlined mirror system.

While the invention has been specifically described in connection with certain embodiments thereof, it is to be understood that this is by way of illustration and not of limitation. Reasonable variation and modification are possible within the scope of the forgoing description and drawings without departing from the spirit of the invention, which is described in the appended claims.

What is claimed is:

1. A mirror system for a motor vehicle, comprising:
    a reflective element assembly providing a reflective view to an occupant of said motor vehicle;
    a support bracket including a pivot end for coupling with said motor vehicle and a cantilevered end for supporting said reflective element assembly, said cantilevered end including
        a bracket wall including a first edge and a second edge,
        said first edge including either a pair of unjoined plate-like receiving catches or a pair of unjoined mounting ears extending away from said first edge of said bracket wall, and
        said second edge including either a plate-like cantilevered locking catch or a third mounting ear extending away from said second edge of said bracket wall, said locking catch including a beveled edge,
        each of said pair of unjoined plate-like receiving catches and said plate-like cantilevered locking catch including an opening therethrough, said beveled edge of said plate-like cantilevered locking catch abutting upon said plate-like cantilevered locking catch opening, and said plate-like cantilevered locking catch being deflectable by a force applied to said beveled edge;
    a tilt actuator for adjusting the reflective view from said reflective element assembly, said tilt actuator including a tilt actuator housing including
        an obverse face for disposition toward said reflective element assembly,
        a reverse face for disposition toward said bracket wall,
        a first actuator wall intermediate said obverse face and said reverse face,
        a second actuator wall intermediate said obverse face and said reverse face, in opposed disposition relative to said first actuator wall,
        a pair of unjoined plate-like receiving catches or a pair of unjoined mounting ears extending away from said first actuator wall, and
        a plate-like cantilevered locking catch or a third mounting ear extending away from said second actuator wall; and
    a housing for enclosing said reflective element assembly, said tilt actuator, and at least a portion of said support bracket, and immovably coupled with said support bracket;

wherein said tilt actuator housing is immovably coupled with said support bracket by inserting said pair of unjoined mounting ears into said openings in said pair of unjoined plate-like receiving catches, pivoting said tilt actuator housing toward said bracket wall, and inserting said third mounting ear into said opening in said plate-like cantilevered locking catch by moving said third mounting ear along said beveled edge, deflecting said plate-like cantilevered locking catch until said third mounting ear can be inserted into said plate-like cantilevered locking catch opening;

wherein immovably coupling said tilt actuator with said support bracket brings said reverse face of said tilt actuator into contact with said bracket wall to minimize vibration of said tilt actuator relative to said support bracket; and wherein said reflective element assembly is adjustable by said tilt actuator independent of said housing.

2. A mirror system in accordance with claim 1, wherein said openings in said pair of unjoined plate-like receiving catches enable insertion of said pair of said unjoined mounting ears into said openings generally orthogonal to said unjoined plate-like receiving catches.

3. A mirror system in accordance with claim 2, wherein said pair of said unjoined mounting ears can be snap-fit into said openings in said pair of unjoined plate-like receiving catches.

4. A fastener system for a motor vehicle mirror system, said mirror system including a reflective element assembly providing a reflective view to an occupant of said motor vehicle, a support bracket coupleable at a pivot end to a motor vehicle and including a cantilevered end for supporting the reflective element assembly, a tilt actuator, including a tilt actuator housing, for adjusting the reflective view from the reflective element assembly, and a housing for enclosing said reflective element assembly, said tilt actuator, and at least a portion of said support bracket, said housing immovably coupled with said support bracket, said fastener system comprising:

at said cantilevered end of said support bracket
    a bracket wall including a first edge and a second edge, said first edge including either a pair of unjoined plate-like receiving catches or a pair of unjoined mounting ears extending away from said first edge of said bracket wall, and
    said second edge including either a plate-like cantilevered locking catch or a third mounting ear extending away from said second edge of said bracket wall, said cantilevered locking catch including a beveled edge,
    each of said pair of unjoined plate-like receiving catches and said plate-like cantilevered locking catch including an opening therethrough, said beveled edge of said plate-like cantilevered locking catch abutting upon said plate-like cantilevered locking catch opening, and said plate-like cantilevered locking catch being deflectable by a force applied to said beveled edge; and on said tilt actuator housing
    an obverse face for disposition toward said reflective element assembly,
    a reverse face for disposition toward said bracket wall,
    a first actuator wall intermediate said obverse face and said reverse face,
    a second actuator wall intermediate said obverse face and said reverse face, in opposed disposition relative to said first actuator wall,
    a pair of unjoined plate-like receiving catches or a pair of unjoined mounting ears extending away from said first actuator wall, and
    a plate-like cantilevered locking catch or a third mounting ear extending away from said second actuator wall;

wherein said tilt actuator housing is immovably coupled with said support bracket by inserting said pair of unjoined mounting ears into said openings in said pair of unjoined plate-like receiving catches, pivoting said tilt actuator housing toward said bracket wall, and inserting said third mounting ear into said opening in said plate-like cantilevered locking catch by moving said third mounting ear along said beveled edge, deflecting said plate-like cantilevered locking catch until said third mounting ear can be inserted into said plate-like cantilevered locking catch opening;

wherein immovably coupling said tilt actuator with said support bracket brings said reverse face of said tilt actuator into contact with said bracket wall to minimize vibration of said tilt actuator relative to said support bracket; and wherein said reflective element assembly is adjustable by said tilt actuator independent of said housing.

5. A fastener system in accordance with claim 4, wherein said openings in said pair of unjoined plate-like receiving catches enable insertion of said pair of said unjoined mounting ears into said openings generally orthogonal to said unjoined plate-like receiving catches.

6. A fastener system in accordance with claim 5, wherein said pair of said unjoined mounting ears can be snap-fit into said openings in said pair of unjoined plate-like receiving catches.

* * * * *